(12) United States Patent
Tanaglia

(10) Patent No.: US 7,553,802 B2
(45) Date of Patent: Jun. 30, 2009

(54) PROCESS TO MODIFY THE RHEOLOGICAL PROPERTIES OF THE EP(D)M POLYMERS AND EP(D)M MIXTURES WITH POLYALPHA-OLEFINS

(75) Inventor: Tiziano Tanaglia, Bologna (IT)

(73) Assignee: Polimeri Europa S.p.A., Brindisi (IT)

( * ) Notice: Subject to any disclaimer, the term of this patent is extended or adjusted under 35 U.S.C. 154(b) by 272 days.

(21) Appl. No.: 11/100,522

(22) Filed: Apr. 7, 2005

(65) Prior Publication Data
US 2005/0239666 A1 Oct. 27, 2005

(30) Foreign Application Priority Data
Apr. 16, 2004 (IT) ............................ MI2004A0751

(51) Int. Cl.
*C10M 101/00* (2006.01)
*C08F 8/08* (2006.01)

(52) U.S. Cl. .................... 508/591; 525/70; 525/263; 525/387

(58) Field of Classification Search ............... 508/591; 525/70, 263, 387
See application file for complete search history.

(56) References Cited

U.S. PATENT DOCUMENTS

| | | | |
|---|---|---|---|
| 3,862,265 A | | 1/1975 | Steinkamp et al. |
| 5,081,179 A | * | 1/1992 | Sezaki et al. ............ 524/526 |
| 5,523,008 A | * | 6/1996 | Boden et al. ............ 508/221 |
| 5,578,682 A | * | 11/1996 | White .................... 525/282 |
| 6,410,652 B1 | * | 6/2002 | Goldblatt et al. ........ 525/279 |

FOREIGN PATENT DOCUMENTS

| | | |
|---|---|---|
| DE | 3642273 A1 | 4/1987 |
| EP | 0 123 424 A2 | 10/1984 |
| EP | 1 013 673 A1 | 6/2000 |
| WO | WO 94/05707 | 3/1994 |
| WO | WO 01/60871 A1 | 8/2001 |
| WO | WO 03/078487 A1 | 9/2003 |

OTHER PUBLICATIONS

Database WPI, AN 1995-110745, XP-002302746, JP 07 033916 A, Feb. 3, 1995.
Database WPI, AN 1986-194129, XP-002302747, JP 61 127714 A, Jun. 16, 1986.

* cited by examiner

*Primary Examiner*—Jeffrey C Mullis
(74) *Attorney, Agent, or Firm*—Oblon, Spivak, McClelland, Maier & Neustadt, P.C.

(57) ABSTRACT

A process is described to modify the rheology of EP(D)M copolymers optionally mixed with polyalpha-olefins, which comprises treating in high shear conditions a polymeric mixture comprising one or more EP(D)M polymers, optionally mixed with polyalpha-olefins, in presence of one or more vinyl multifunctional monomers and of one or more hydroperoxides, with the amount of vinyl multifunctional monomer comprised between 0.02 and 2.0 by weight, preferably between 0.05 and 1% by weight, with the molar ratio between the vinyl monomer and hydroperoxide being comprised between 0.005/1 and 2/1, preferably between 0.01/1 and 1/1, said process being performed at a temperature between 75° C. and 260° C., preferably between 140° C. and 210° C.

21 Claims, No Drawings

PROCESS TO MODIFY THE RHEOLOGICAL PROPERTIES OF THE EP(D)M POLYMERS AND EP(D)M MIXTURES WITH POLYALPHA-OLEFINS

The present invention refers to a process to modify the rheological properties of EP(D)M polymers optionally mixed with polyalpha-olefins.

With the term of EP(D)M polymers, we intend ethylene—propylene (EPM) copolymer and ethylene—propylene—diene terpolymers (EPDM).

The process of the present invention allows to modify the rheology of EP(D)M polymers however without substantially modifying the distribution of the molecular weights and avoiding the formation of reticulated material.

The products obtainable from a Ziegler-Natta type of polymerization, in particular EP(D)M polymers, are typically straight, with rheologies modifiable only by controlling the molecular weights or the distribution of the molecular weights.

Products with a wide distribution of molecular weights are used to improve the shear sensitivity of the polymers (or mixtures) to achieve a better stability of shape with equal fluidity. In the elastomer case, said polymers show better carbon black dispersion properties. However, a wide MWD also entails stickiness (due to a low MW), slower vulcanization and worse elastic properties of the final product.

A rich bibliography exists which shows the advantages of using products having optimal rheologies due to the branching of the polymer chains or to particular bimodal structures. In particular, it is by now well known to the experts of the field that branched or bimodal products have advantages over the straight products as far as the speed of carbon black dispersion and extrusion speed, without suffering from the disadvantages which are typical of products with a wide distribution of molecular weights. On the contrary, some problems might arise or not, depending the application, relative to an excessive swelling in the extrusions and shrinkage due to the greater elasticity in the melted product: in other words, according to the final application, understood as formulation, molding technique and characteristics of the product, the optimal degree of branching can vary over a wide range.

Processes to obtain such branched products directly in polymerization are reported frequently in the patents literature; in particular, these documents (see for instance U.S. Pat. Nos. 4,156,767 and 4,510,303) refer to ethylene terpolymers and tetrapolymers in which, in polymerization, polyenes having more than one double bond that can be polymerized via Ziegler-Natta are used. In such case the branching, even if it improves properties such as the relationship between stability of shape, viscosity in extrusion and, in general, the processability of the polymer, is still difficult to control especially in processes of heterogeneous type and can easily result in the formation of reticulated or difficultly dispersible material. Moreover, the industrial polymerization processes are characterized by their insufficient flexibility and, therefore, it would not be possible to produce a complete range of products oriented to the single applications/formulations/final uses, without frequent uneconomical changes of production. In the EP(D)M type products, the branchings can be generated by cationic coupling due to the acid species of the Ziegler-Natta catalyst, through non-controllable secondary reactions and, therefore, without any uniformity in their effect on the polymer.

EP-A-0801084 describes a multi-stage polymerization process for the production of EP(D)M mixtures, optionally bimodal (therefore without undesired widening of the distribution of low molecular weights), controlling at will the compositions of the polymer bases in the mixtures to avoid the combination of low molecular weight—low propylene content, typical of the Ziegler-Natta polymerization. The process was, moreover, characterized by allowing a perfect homogeneity in the mixing of the polymer bases avoiding complex and not always efficient off-line mixing steps. The process while on one hand was characterized by a practically absolute flexibility in selecting polymers having the desired properties, on the other hand was difficult and expensive in its practical realization.

EP-A-1,013,673 describes the use of products of hydroperoxide nature to reduce the molecular weight of ethylene-propylene copolymers and to obtain polymers difficult to be produced in industrial polymerization plants. In the transformation process, object of said invention, the polymer base was submitted to a high shear treatment in presence of a substance of hydroperoxide nature characterized by not having an appreciable decomposition under the thermal conditions of the treatment. The process was performed at high shear, applicable by using the most common transformation machines for polymer materials, preferably a twin-screw extruder. However, the process described in EP-A-1,013,673 had the disadvantage of not being able to modulate the degree of branching for the treated materials.

Now it has been found that treating EP(D) M polymers in conditions of high shear in presence of at least one substance of hydroperoxide nature and at least of an unsaturated polyfunctional monomer, it is possible to control the level of branching of the polymer material.

In agreement with the above, the present invention relates to a process for modifying the rheology of EP(D)M polymers, optionally mixed with polyalpha-olefins, which comprises treating in high shear conditions a polymer mixture comprising one or more EP(D)M polymers, optionally mixed with polyalpha-olefins, in presence of one or more polyfunctional vinyl monomers and of one or more hydroperoxides, the polyfunctional vinyl monomer amount being from 0.02 to 2% by weight, preferably from 0.05 to 1% by weight, the molar ratio between vinyl monomer and hydroperoxide being from 0.005/1 to 2/1 molar, preferably from 0.01/1 to 1/1 molar, said process being carried out at a temperature from 75° C. to 260° C., preferably from 140° C. to 210° C.

The term EP(D)M comprises either the EPM (ethylene-propylene) copolymers or the EPDM terpolymers (ethylene-propylene-not-conjugated diene terpolymers) in which the ethylene content is from 85% to 40% by weight, preferably from 76% to 45%. The possible not-conjugated diene is present in a maximum amount of 12% by weight, preferably 5% by weight. Moreover, the EP (D) M polymers have the following properties:

Molecular weight ($M_w$) from 70,000 to 500,000, preferably from 90,000 to 450,000;

Polydispersity expressed as $M_w/M_n$ less than 5, preferably from 1.8 to 4.9.

The molecular weight $M_w$ is determined via GPC with a refractive index detector.

In the case of the EPDM terpolymers, the diene is selected from:

straight chain dienes as 1,4-hexadiene and 1,6-octadiene;
branched chain alicyclic dienes as 5-metyl-1,4-hexadiene; 3,7-dimethyl-1,6-octadiene; 3,7-dimethyl-1,7-octadiene;
single ring alicyclic dienes as 1,4-cyclohexadiene; 1,5-cyclooctadiene; 1,5-cyclododecadiene;
alicyclic bridge and fused rings dienes as methyltetrahydroindene; dicyclopentadiene;

bicyclo[2.2.1]hepta-2,5-diene; alkenyl, alkyliden, cycloalkenyl and cycloalkyliden norbornens as 5-methylen-2-norbornen; 5-ethyliden-2-norbornen (ENB); 5-propenyl-2-norbornen.

In the preferred embodiment the diene is 5-ethyliden-2-norbornen (the ENB).

The other optionally usable polymer bases in mixture with EP(D)M are selected among the polyolefins. For instance:
copolymers or elastomeric terpolymers of ethylene with different compositions;
thermoplastics homopolymers, or copolymers with alpha-olefins, of ethylene and of propylene;
ethylene copolymers with other vinyl monomers such as: vinylacetate, alkyl metacrylate etc. (i.e. EVA, EBA, EMA);
copolymers with hydrogenated blocks of conjugated diolefins and styrene (SEBS, SPC etc.).

In the preferred embodiment, the poly-α-olefins which are optionally used in the process of the present invention are selected from polyethylene and polypropylene.

The polyfunctional vinyl monomers used in the process of the present invention are referable to a general formula (Ia)

$$(HR^1C=CR^2-X-)_n-R^3 \qquad (Ia)$$

in which $R^1$ and $R^2$, equal or different, are selected between —H and alkyl radical $C_1$-$C_5$, X=—COO; n=2-4, preferably selected between 2 and 3; $R^3$ is the polyfunctional radical to which the n unsaturated units are bonded; or (Ib)

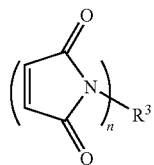

(Ib)

in which n and $R^3$ have the above explained meaning.

Typical examples of said polyfunctional vinyl monomers (Ia) and (Ib) are for instance trimethylolpropane trimetacrylate, ethylene glycol dimetacrylate, N,N'-m-phenylenedimaleimide.

Typical examples of hydroperoxides are t-butyl hydroperoxide (TBHP), 2,5-dihydroperoxy-2,5-dimethylhexane (2,5-2,5), cumene hydroperoxide (CUHP), t-amyl hydroperoxide (TAHP).

With the term "high shear", we intend any shear higher than 100 $sec^{-1}$, preferably higher than 500 $sec^{-1}$. The process of the present invention can be performed using the most common transformation machines for polymer materials, for instance a continuous extruder or, preferably, a twin-screw extruder or a ko-kneter type extruder.

In an embodiment of the present invention, the process can be carried out in presence of antioxidants, in amounts not higher than 5% by weight.

The process of the present invention can be carried out as a continuous process during the finishing phase of the production process for the generating polymer base. In such case the totality or, preferably, a part of the polymer in the finishing phase (before the final forming) would be taken from the standard flow and conveyed into the transformation machine selected for the process object of the invention.

The process, object of the present invention, is capable to substantially modify the rheology of the initial polymer obtaining branched structures. By varying the temperature and shear conditions, and using variable amounts and types of polyfunctional vinyl monomers (bifunctional or trifunctional) it is possible to control the degree and type of branching. Moreover, the same process, if applied to polymer mixtures, makes such mixtures characterized by grafts of one polymer base on the other and vice versa.

The product obtained with the process of the present invention consists, at least in part, of a poly-alpha-olefin, preferably a copolymer of ethylene or of propylene with alpha-olefins, more preferably an ethylene propylene copolymer or an EPDM terpolymer, having the following characteristics:
average weight molecular weight, obtained from GPC analysis with refractive index detector, comprised in the range 30,000-500,000, preferably 50,000-300,000;
polydispersity, expressed as $M_w/M_n$, lower than 7, preferably from 2 to 4;
ratio between the areas calculated according to the Mooney relaxation method and the Mooney, higher than 2.2, preferably higher than 3.5.

The Mooney relaxation method consists of executing the test of relaxation at the completion of the measurement of the Mooney viscosity.

The area of ML relaxation (MLRA) represents the area subtended at the curve ML versus time obtained by continuing to measure the blocked-rotor torque beyond the limit of the ML test.

It is therefore a parameter that represents a stored energy and it is usually standardized dividing it by the ML value.

The slope (MRS) is instead the slope of the LOG(ML) line versus LOG(time) and it is perfectly correlated to the ratio area/ML.

The more the absolute value of the slope is low, in other words the higher is the ratio area/ML, the more elastic is the material.

In reality, because of instrument adaptations and reproducibility problems, the ML relaxation method was rigidly structured. Only the experimental values detected in the range 1.6-5 sec. after the rotor was stopped are elaborated. From these values, the log ML versus LOG(time) line is elaborated, from which the slope is directly obtainable and the area is obtainable by integration from t=1 to t=100 sec.

For more details see Kautschuk+gummi Kunststoffe 43 (1990), page 431 and J. Appl. Polym Ski. 74 (1999), page 1220.

The products obtained with the process of the present invention are characterized by the elasticity values typical of high or very high molecular weights even having such fluidities and viscosities which guarantee a very high degree of processability and workability.

In the experimental part it will be shown how, in comparison with the initial EP(D)M, the product treated according to the process of the present invention is characterized by having gained both in elasticity and in fluidity (intended as a reduction of viscosity) at the same time.

The product obtained with the process of the present invention can be used in subsequent applications either as such or mixed, especially because of economical reasons and practicality in subsequent uses, with reinforcing fillers (for instance carbon black and silica) up to a maximum of 50%, preferably maximum 25%, and/or with plasticizers (for instance solid paraffin or paraffinic oil) up to a maximum of 60%.

In an optional realization of the present invention, the polymer object of the present invention is employed in the final application in conjunction with a non-modified product, the latter being present in amounts from 0 to 95% of the total polymer amount, preferably from 0 to 75%. This is done also to retrieve part of the costs of the treatment according to the invention.

Concerning the use of the product obtained through the process of the present invention, the range of applications is very wide and varies in function of the final characteristics of the product itself. In particular, the product obtained with the process of the present invention can be used to modify the rheological properties of EPM and EPDM. Indeed, even modifying the rheology/processability, its Mooney viscosity is not substantially modified.

The experimental part will show the multiple applications of the product obtained with the process of the present invention.

Thus, for instance, the product object of the present invention is successfully applicable to improve the rheology and the processability of elastomeric carbon black based compositions.

If employed for the preparation of carbon black based mixtures, the product obtained according to the present invention, alone or in combination with other not-modified EP(D)M, is preferably used according to the following scheme: saying 100 the total of the elastomeric components of the mixture, at least 40 parts being the product obtained according to the process of the present invention, the remaining parts of the mixtures are as follows:

from 20 to 350 carbon black parts, preferably between 50 and 200;
from 0 to 200 parts, preferably from 0 to 50 parts, of mineral filler, preferably selected between calcium carbonate, kaolin, silica and talc;
from 0 to 160 parts, preferably from 25 to 120 parts of plasticizer, the preferred ones being mineral oil and paraffinic wax;
from 0 to 5 parts of process adjuvant additive, stearic acid and polyethylene glycol being the preferred ones;
from 0 to 5 parts of anti-oxidant;
from 0 to 5 calcium oxide parts;
from 0 to 10 parts of zinc or lead oxide.

Also used are vulcanizing agents well known to the experts of the field and used for the vulcanization of the ethylene-propylene elastomers based mixtures. Typically these are organic peroxides and coagents for EPM and EPDM sulfur based and accelerating agents for EPDM.

Such additives can be added either during the first phase of the mixing or during any successive phase.

Moreover, the product of the invention can be used in the preparation of mineral fillers based mixtures, in particular, in the preparation of mixtures used in the cable insulation field. If employed for the preparation of mineral fillers based mixtures, the product obtained according to the present invention, alone or in conjunction with other low molecular weight non modified EP(D)M or polytenes (max density 0.925 g/cc), is preferably used according to the following scheme:

saying 100 the sum by weight of the polymer components, consisting of at least 50 parts of the polymer obtained according to the process of the present invention, the mixture comprises:

from 25 to 300 parts of mineral filler, preferably between 30 and 100, such mineral filler being selected among calcined kaolin, talc, calcium carbonate and/or magnesium, silica, magnesium and aluminum hydroxide, and relative mixtures; preferably kaolin;
from 0 to 100 parts of plasticizer selected among mineral oil and paraffinic wax, with max 10 paraffinic wax parts for insulation for medium high voltage cables;
from 0 to 2 parts of process adjuvant additive, preferably selected between stearic acid and polyethylene glycol;
from 0 to 5 parts of coupling agent for mineral fillers, preferably selected among the derivates of vinyl silanes, for instance vinyl-triethoxy silane; vinyl tris(beta-methoxyethoxy) silane;
from 0.5 to 5 parts of antioxidant;
from 0 to 10 parts of zinc oxide and/or lead oxide;
from 0 to 15 parts of a coagents for the peroxidic vulcanization, selected among liquid polybutadiene, triallyl cyanurate, N,N'-m-phenylendimaleimide, ethylendimetacrylate;
from 0.4 to 5 parts of peroxide selected among those normally used for the reticulation of EPR, preferably at 40% carried in EPR (from 1 to 15 parts), the dicumyl peroxide and the di(tert-butylperoxy-isopropyl)benzene being the preferred ones.

The peroxides for the vulcanization can be added either during the first phase of the mixing, or during any successive phase according to the selected mixing technique.

Moreover, the product of the invention can be used for the modification of high fluidity polypropylene. Indeed, the products obtained according to the present invention are characterized by a high elasticity even being extremely fluid and therefore highly dispersible inside the polypropylene matrix. The product obtained according to the process of the present invention can therefore be employed, as demonstrated in the experimental examples that follow, to modify plastic materials and, with a special advantage, to modify high fluidity isotatic polypropylenes.

By combining low viscosity with high elasticity (ML relaxation), the products obtainable according to the claim of the present invention have indeed low viscosities in shear (to approach those of the polypropylene and to improve their compatibility), coupled with high elasticity at substantial relaxation (low shear). The product is, therefore, very usable for polypropylene having melt index at 230° C., 2.16 kg, higher than 6 g/10', preferably higher than 12 g/10', even more preferably higher than 20 g/10'.

Homopolymer polypropylene or copolymer with ethylene and/or other alpha-olefins can be used.

The ratio between polypropylene and the product obtained according to the present invention varies from 95:5 to 65:35, preferably between 90:10 and 75:25. Other ingredients can optionally be used such as mineral and organic fillers, antioxidants, other polymers, oils and plasticizers. Finally the product of the present invention can be used in the V.I.I. (Viscosity Index Improvers) field.

In the V.I.I. field the polymer object of the present invention is characterized by an optimum balance of rheological properties at high and low temperature.

In particular, as known to the experts of the field, the ethylene propylene copolymers used in the V.I.I. field, if obtained with a high ethylene content, allow the maximization of the rheological properties at high temperature (thickening); however, being crystalline, they tend to form superstructures at low temperature that diminish the properties of the oil, such as the pumpability, at the cold start of the motor.

However, the balance of the properties cannot be achieved through intermediate ethylene compounds because these compounds contain ethylenic sequences (medium) capable of interfering with the pour point depressant additives of the oil, compromising their activity and further worsening the low temperature rheology of the lubricating oil.

It is therefore common practice in the field to use crystalline seed products mixed with amorphous products to balance their properties; in some cases these products, in combination with each other or separately, are submitted to thermo-degradation in an extruder.

The possibility of creating a chemical bond between the polymer chains deriving from the different bases of a blend maximizes its effectiveness in the application. This occurs because, as demonstrated in the following experimental examples, the effectiveness of the amorphous base is maximized in interfering in the mechanisms of self-association of the crystalline chains.

The process of the present invention if applied to V.I.I. sector consists of a mixture EPM or EPDM, being EPM preferable, with high or low ethylene content, the high ethylene content being at least 69% by weight and the low not more than 60% by weight of ethylene.

The ratio between the two is variable from 80% to 20% of EPM at high ethylene, preferably between 70% and 45%.

To avoid too many long chain branchings and molecular weight distributions tending to bimodality, it is preferable to limit the use of the polyfunctional monomer only to the bifunctional substances and in a percentage not higher than 0.7% of the total weight.

The following examples are described for a better understanding of the present invention.

EXPERIMENTAL EXAMPLES

Material:
Dutral CO058 ethylene-propylene copolymer Polimeri Europa having 48% wt propylene and ML (1+4) at 100° C.=77.
Dutral CO034 ethylene-propylene copolymer Polimeri Europa having 28% wt propylene and ML (1+4) at 100° C.=44.
Dutral CO038 ethylene-propylene copolymer Polimeri Europa having 28% wt propylene and ML (1+4) to 125° C.=58 and MLRA=76.
EPM 1—Mixture CO034+CO058 3:2 prepared in an open mixer having ML (1+4) at 100° C.=57.9 and MLRA=66.4.
t-butyl hydroperoxide (TBHP) of Akzo Nobel Chem. at 70% in water solution (trade name Trigonox$^R$ AW70).
TMPTMA Bisomer (trimethylolpropane trimetacrylate).
EGDMA—Sartomer 206 (ethylenglycole dimetacrylate).
Antioxidant phenolic Anox$^R$ PP18 (Great Lakes).
Carbon black series FEF N550.

The examples that follow are relative to the possibility of obtaining polymer chains with branchings and therefore controlled rheology. The products obtained with TBHP have a certain level of branching that, through the dosage of the polyfunctional monomer, can be modified to an optimum level for the application.

The examples 2c-3c-4c-5A-6A-7A-5B-6B-7D were carried out in a twin-screw type extruder Maris TM35V having 35 millimeter diameter screws and L/D=32 with conditions and screw profiles to obtain a shear rate approximately of 600-1200 s$^{-1}$ for a time shorter than one minute.

The comparative examples 14 and 15 and example 16 were carried out in a mixing room plastograph (Haake Rheocord 90) in conditions suitable to obtain a shear rate of approximately 200 s$^{-1}$ for 2 minutes.

Section 1: Rheological Modification of the Product
The results of these tests are shown in table 1.

Comparative Example 1

A mixture of (EPM1) CO034+CO058 3:2 having ML (1+4) at 100° C.=57.9 and MLRA=66.4 is prepared in an open mixer.

Comparative Examples 2

60 phr CO034
40 phr CO058
Antioxidant=0.05 phr
RPM=240 (rotation speed of the screws in RPM)
Temperature of high shear zones=175-220° C.

Characterizations of the End Product:
Solubility in xylene >99.9%
ML (1+4) at 100° C.=33.2
MLRA=31.8

Comparative Examples 3

60 phr CO034
40 phr CO058
Antioxidant=0.05 phr
RPM=250
Temperature of high shear zones=190-230° C.

Characterizations of the End Product:
Solubility in xylene >99.9%
ML (1+4) at 100° C.=30.5
MLRA=25.3
MFI (l)=2.4 g/10'

Comparative Examples 4

60 phr CO034
40 phr CO058
hydroperoxide TBHP=0.75 phr
Antioxidant=0.05 phr
RPM=250
Temperature of high shear zones=160-190° C.

Characterizations of the Final Product:
Solubility in xylene >99.9%
ML (1+4) at 100° C.=25.4
MLRA=55.4
MFI (l)=2.6 g/10'

Example 5A 60 phr CO034
40 phr CO058
hydroperoxide TBHP=0.75 phr
monomer TMPTMA=1 phr
Antioxidant=0.05 phr
RPM=250
Temperature of high shear zones=160-190° C.

Characterizations of the Final Product:
Solubility in xylene >99.9%
ML (1+4) at 100° C.=36.7
MLRA=409

Example 6A 60 phr CO034
40 phr CO058
hydroperoxide TBHP=0.75 phr
monomer TMPTMA=0.5 phr Antioxidant=0.05 phr
RPM=250
Temperature of high shear zones=160-190° C.

Characterizations of the Final Product:
Solubility in xylene >99.9%
ML (1+4) at 100° C.=35.1
MLRA=331

Example 7A 60 phr CO034
40 phr CO058
hydroperoxide TBHP=0.75 phr
monomer TMPTMA=0.2 phr
Antioxidant=0.05 phr
RPM=250
Temperature of high shear zones=160-190° C.

Characterizations of the Final Product:
Solubility in xylene >99.9%
ML (1+4) at 100° C.=33.2
MLRA=196

Example 5B 60 phr CO034
40 phr CO058
hydroperoxide TBHP=0.75 phr
monomer EGDMA=0.5 phr
Antioxidant=0.05 phr
RPM=250
Temperature of high shear zones=160-190° C.

Characterizations of the End Product:
Solubility in xylene >99.9%
ML (1+4) at 100° C.=29.0
MLRA=170.1

Example 6B 60 phr CO034
40 phr CO058
hydroperoxide TBHP=0.75 phr
monomer EGDMA=0.2 phr
Antioxidant=0.05 phr
RPM=250
Temperature of high shear zones=165-200° C.

Characterizations of the End Product:
Solubility in xylene >99.9%
ML (1+4) at 100° C.=24
MLRA=97.1
MFI (l)=2.0 g/10'

Example 7D 100 phr CO038
RPM=250 (rotation speed of the screws in RPM)
Temperature of high shear zones=160-205° C.
TBHP=1.0 phr
TMPTMA=0.25 phr
Antioxidant=0.05 phr Characterizations:
Solubility in xylene >99.9%
ML (1+4) at 100° C.=26.7
MLRA=153
MSR (slope)=−0.587
MLRA/ML=5.75
ML (1+4) at 125° C.=18.4
MSR (slope)=−0.634
MLRA/ML=5.11

TABLE 1

| Example | TBHP phr | TMPTMA phr | EGDMA phr | ML (1 + 4) at 100° C. | MLRA (area) | MRS (slope) | MLRA/ML |
|---|---|---|---|---|---|---|---|
| 1 comp | 0 | 0 | 0 | 57.9 | 66.4 | −1.14 | 1.14 |
| 2c comp | 0 | 0 | 0 | 33.2 | 31.8 | −1.15 | 0.96 |
| 3c comp | 0 | 0 | 0 | 30.5 | 25.3 | −1.14 | 0.83 |
| 4c comp | 0.75 | 0 | 0 | 25.4 | 55.4 | −0.81 | 2.18 |
| 5A | 0.75 | 1.0 | 0 | 36.7 | 409 | −0.43 | 11.14 |
| 6A | 0.75 | 0.5 | 0 | 35.1 | 331 | −0.46 | 9.43 |
| 7A | 0.75 | 0.2 | 0 | 33.2 | 196 | −0.56 | 5.90 |
| 5B | 0.75 | 0 | 0.5 | 29.0 | 170.1 | −0.58 | 5.86 |
| 6B | 0.75 | 0 | 0.2 | 24.0 | 97.1 | −0.65 | 4.05 |
| 7D | 1.00 | 0.25 | 0 | 26.7 | 153 | −0.59 | 5.75 |
| 7D* | 1.00 | 0.25 | 0 | 18.4 | 94 | −0.63 | 5.11 |

*ML (1 + 4) at 125° C.

With a simple dosage of the polyfunctional monomer (TMPTMA) it was possible to obtain a particularly branched polymer with modified rheology both in respect to a simple degradation and in respect to the product as is. Starting from the product obtained for treatment with TBHP (already modified with respect to the simple degradation) we obtain, through the dosage of the polyfunctional monomer, a series of products with stepped branchings. In any case, this attains rheologies aimed at specific applications.

The substitution of the trifunctional monomer (TMPTMA) with a bifunctional monomer (EGDMA) has allowed further control on the degree of branching.

The product obtained with TBHP has a rheology that is modified with respect to the simply degraded products and with respect to the product as is. However, the use of the polyfunctional monomer has the double advantage of making the modification more evident and of making the modification more controllable by controlling its concentration.

Section 2: Peroxide Based Comparative Examples (Comparison with Section 1).

To better illustrate the peculiarity of the present invention (use of hydroperoxides+polyfunctional monomers), two tests were carried out (comparative examples 14 and 15) replacing the hydroperoxide with a peroxide.

These two tests were carried out in a plastograph. The choice of carrying out these tests in a plastograph rather than in a twin-screw is generated by safety and maintenance problems, in expectation of the degradation and reticulation problems, typical of peroxidic systems that could have damaged the extruder.

Comparative Example 14

70 cc Mixing room equipped with cam rotors, filled with:
18.5 g of Dutral CO058.
37.0 g of Dutral CO034
0.20 g of monomer TMPTMA
1.40% of dicumyl peroxide carried at 40% (equivalent to 1 phr DCP equimolecular with 0.33 phr of TBHP);
thermostat controlled at 135° C. (external) and kept mixing at 50 RPM.
left to plasticize for 1'(1 minute)
Then the speed of the rotors is suddenly increased to 200 RPM, the temperature increases up to approximately 210° C. and the twisting torque measured by the instrument, instead of decreasing, has an oscillating behavior reaching a second torque peak after approximately 1 minute from the increase of speed.
After 2 minutes of mastication the experiment is interrupted. The product, which looks like a rubbery non plasticize powder, is cooled off and retrieved.
The product cannot be calendered at 130° C.

It has not been possible to calender under pressure a thin and transparent film to carry out the FTIR analysis.

However a sample for the analysis of the Mooney viscosity in a compression press was prepared; ML (1+4) at 100° C.=140.

The graph of ML viscosity versus time identifies a peak indicating a stiffening of the material during the deformation.

This sample was submitted to a reflux solubility test in xylene, obtaining as a result the fact that approximately 50% of the product was insoluble and, therefore, was reticulated.

Comparative Example 15

70 cc Mixing room equipped with cam rotors, filled with:
18.5 g of Dutral CO058
37.0 g of Dutral CO034
0.16 g of TMPTMA monomer
0.70% of dicumyl peroxide carried at 40% (equivalent to approximately 0.5 phr DCP equimolecular with 0.167 phr of TBHP)
thermostat controlled at 135° C. (external) and kept mixing at 50 RPM.
Left to plasticize for 1'(1 minute).
Then the speed of the rotors is suddenly increased to 200 RPM, the temperature increases up to approximately 210° C. and the twisting torque measured by the instrument, instead of decreasing, has an oscillating behavior reaching a second torque peak after approximately 1 minute from the increase of speed.
After 2 minutes of mastication the experiment is interrupted. The product, which looks like a rubbery non plasticized powder, is cooled off and retrieved.
The product cannot be calendered at 130° C.

It has not been possible to calender under pressure a thin and transparent film to carry out the FTIR analysis.

However a sample for the analysis of the Mooney viscosity in a compression press was prepared; ML (1+4) at 100° C.=90.

The graph of ML viscosity versus time identifies a peak indicating a stiffening of the material during the deformation. This sample was submitted to a reflux solubility test in xylene, obtaining as a result that approximately 50% of the product was insoluble and was therefore reticulated.

To further confirm the shown data, the Melt Index analyses were carried out at 230° C. 2.16 and 21.6 kg of the products of the comparative examples 14 and 15 with respect to those of examples 5A, 6A and 7A.

MFI 230° C. 2.16 kg:
Comparative Example 14=it does not extrude.
Comparative example 15=it does not extrude.
Example 5A=0.06 g/10' normal extrusion.
Example 6A=0.28 g/10' normal extrusion.
Example 7A=0.58 g/10' normal extrusion.
MFI 230° C. 21.6 kg:
Comparative example 14=2.9 g/10'; not plasticized product extrusion with a wide variation of flow during the test.
Comparative example 15=6.8 g/10'; not plasticized product extrusion with a wide variation of flow during the test.
Example 5A=21.5 g/10' normal extrusion.
Example 6A=33.9 g/10' normal extrusion.
Example 7A=52.8 g/10' normal extrusion.

The difference that is found with respect to the examples 5A, 6A and 7A of the invention is obvious. Starting from an initial mixture having them ML 57.9, without modifying their compositions, the products of the invention, even if varying inside a wide range of branching effectiveness, have controlled Mooney viscosities, lower than those of the generating products.

Moreover, the 5A-7A products do not have characteristics that could reflect gelification problems or even only machinability problems, even presenting, in some cases, a high stored energy (high elasticity).

On the contrary, in the comparative examples 14 and 15, the polymers have difficulty in plasticizing or they do not plasticize at all.

Comment to the Examples 1-7A and 14-15

The low Mooney viscosity of the products object of the invention is favorable, as these products are characterized by elasticity values typical of high or very high molecular weights even though having such fluidity and viscosity to guarantee an optimal processability and machinability.

With respect to the mixture corresponding to the generating product (EPM 1), all the products of the examples relative to the invention are characterized by having increased their elasticity and fluidity (intended as a reduction of viscosity) at the same time.

Besides the different application value of the products of the invention is very clear, a possible dispersion of the polymers, object of the invention, to obtain mixtures with improved rheology for several fields of application would not have particular contraindications because it would anyhow have an ML viscosity on average lower than the other polymers in the mixture (as in the illustrated examples), while the products obtained with peroxides (comparative examples 14 and 15) are anyhow characterized by a high ML and, therefore, have worse dispersion capacities.

In the case of the modification of high fluidity polypropylene (as demonstrated in the examples that follow) the products object of the present invention are characterized by having high elasticity although being extremely fluid and, therefore, they are well dispersible inside the polypropylene matrix. The treatment with peroxides is, on the contrary, capable of raising the elasticity of the material but without improving (indeed remarkably worsening it) its dispersion in the thermoplastic matrix and, therefore, compromising its properties.

Section A: Application of the Rheological Modification to Carbon Black Based Mixtures.

In the following examples a mixture between the product of the example 5A and the standard Dutral CO058 was made. This is to demonstrate that the product of example 5A, besides having a rheology exploitable as such, can be used as an additive of traditional EPM or EPDM to improve their rheology.

In this case the impact of the cost of post modification would be remarkably reduced.

Simplified application mixtures are then prepared to demonstrate that the product object of the invention is successfully applicable to improve the rheology and the processability of carbon black based elastomeric formulations.

Mixture CO058/5A 4:1

In an open mixer the following polymer-mixture was prepared:

25 g of the polymer of example 4A+75 g of CO058 at 130° C. homogenizing for 10 min.

| Sample | 100° C. | MRS (slope) | MLRA/ML (Area/ML) |
|---|---|---|---|
| Dutral CO058 | 77 | −1.19 | 1.29 |
| Mixture CO058/Ex. 5A-4:1 | 75 | −0.77 | 3.47 |

From the table it can be observed that also the mixture with 25% of the polymer of example 5A has rheologies clearly modified with respect to the polymer as is.

It must be noted that in spite of the difference of ML between the comparative example 1 and the product of example 5A (58-37), the mixtures relative to the invention have an ML closer to the non modified CO058. This makes the application of the product of example 5A as an additive to modify the rheological properties of EPM and EPDM even more attractive; indeed, while it is suitable to modify the rheology/processability it does not substantially modify the Mooney viscosity.

Comparative Example 9

In a laboratory 70 cc room plastograph, the following formulation was prepared:
100 parts of Dutral CO058
110 parts of Carbon black type FEF 550
55 parts of paraffinic type Oil Conditions of Mixing:
Cams type rotors
Rotors rotation speed 60 RPM.
External temperature 80° C.

The carbon black and the paraffinic oil were added in a first phase, then after approximately one minute the piston was raised and the polymer base was added. From the moment in which the piston was lowered, the acquisition program of the twisting torque and of the temperature of the melted material was started for a period of 10 minutes.

The mixture was finally discharged.
ML (1+4) at 100° C. polymer base=77
ML (1+4) at 100° C. mixture=78
MLRA (ML relaxation area) mixture=288.8
Area/ML mixture=3.71
MRS(Slope)=−0.6475

Example 10

In a laboratory plastograph with a 70 cc room the following formulation was prepared:
75 parts of Dutral CO058
25 parts of the product of example 5A
110 parts of Carbon black type FEF 550
55 parts paraffinic type Oil Conditions of Mixing:
Cams type rotors
Rotors rotation speed 60 RPM.
External temperature 80° C.

The carbon black and the paraffinic oil were added in a first phase, then after approximately one minute the piston was raised and the polymer base was added.

From the moment in which the piston was lowered, the acquisition program of the twisting torque and of the temperature of the melted material was started for a period of 10 minutes.

The mixture was finally discharged.

The polymeric bases used to carry out said test were homogenized in an open mixer, thus a sample was obtained to determine the Mooney viscosity of the total polymeric base.
ML (1+4) at 100° C. polymer base=75
ML (1+4) at 100° C. mixture=67
MLRA (ML relaxation area) mixture=294.9
Area/ML mixture=4.40
MRS(Slope)=−0.5859

From the above data it is clear that, in spite of the very small difference of ML of the polymer base, the mixtures in issue have very different mixture ML's.
ML mixture−ML compound (ex. 9)=−1
ML mixture−ML compound (ex. 10)=8

This emphasizes a better dispersion of carbon black in the case of the mixture obtained from the polymer base with the addition of the product object of the present invention.

Moreover, carefully evaluating the characteristics of the mixture of example 10 with respect to that of example 9, it is observed that, in spite of the fact that the Mooney viscosity is lower, the product of example 10 has a higher elasticity, detectable through the ML relaxation test, which determines a better shape stability.

It is therefore legitimate to expect that the product of example 10 be more fluid in extrusion even having a better shape stability.

To this purpose, an extrusion test with a piston rheometer was carried out.

Approximately 8 g of the mixture were placed in the cavity of the instrument, thermostat controlled at 100° C., and under compression of the piston (which was also thermostat controlled at 100° C.) at 55 bars were made to flow in a circular hole of 2 mm of diameter.

1841 $mm^3$ of the sample of mixture of the comparative examples 9 flew out in 48 seconds.

2221 $mm^3$ of the sample of mixture of example 10 flew out in 48 seconds (a volume approximately 20% higher).

Combining the data of elasticity of the mixture obtained from the ML relaxation test with the data of fluency obtained from the test carried out with the piston rheometer, it is clear, therefore, that the advantages of using the product of example 5A as a modifying additive for the EP(D)M rheology are obvious.

Section B: Application of the Rheological Modification to Mixtures for Cables.

In the examples that follow simplified application mixtures are prepared for the cables sector to demonstrate that the product object of the invention is successfully applicable to improve the rheology of mineral fillers based elastomeric formulations.

Comparative Example 11

In a laboratory plastograph with a 70 cc room the following formulation was prepared:
40 parts of Dutral CO058
60 parts of Dutral CO034
50 parts of kaolin (whitetex)
5 parts of solid paraffin
1 part of A172 (vinyl tris(beta-methoxyethoxy)silane)

Conditions of Mixing:
Cams type rotors
Rotors rotation speed 60 RPM.
External temperature 75° C.

In a first phase the polymers were added, then the piston was lowered and plasticization was allowed for one minute. The piston then was raised and the other ingredients were added.

From the moment in which the piston was lowered, the acquisition program of the twisting torque and of the temperature of the melted material was started for a period of 10 minutes.

The mixture was finally discharged.
ML (1+4) at 100° C. polymer base=57.9
ML (1+4) at 100° C. mixture=64.4
MLRA (ML relaxation area) mixture=75.5
Area/ML mixture 1.17
MRS(Slope)=−1.081

Example 12 of Comparison

In a laboratory plastograph with a 70 cc room the following formulation was prepared:
100 parts of comparative example 3
50 parts of kaolin (whitetex)
5 parts of solid paraffin
1 part of A172 (vinyl tris(beta-methoxyethoxy)silane)

Conditions of Mixing:
Cams type rotors
Rotors rotation speed 60 RPM.
External temperature 75° C.

In a first phase the polymers were added, then the piston was lowered and plasticization was allowed for one minute. The piston was then raised and the other ingredients were added.

From the moment in which the piston was lowered, the acquisition program of the twisting torque and of the temperature of the melted material was started for a period of 10 minutes.

The mixture was finally discharged.
ML (1+4) at 100° C. polymer base=30.5
ML (1+4) at 100° C. mixture=37.1
MLRA (ML relaxation area) mixture=32.1
Area/ML mixture=0.87
MRS(Slope)=−1.0944

Example 13

In a laboratory plastograph with a 70 cc room the following formulation was prepared:
100 parts of example 5A
50 parts of kaolin (whitetex)
5 solid paraffin parts
1 part of A172 (vinyl tris(beta-metoxyetoxy)silane)

Conditions of Mixing:
Cams type rotors
Rotors rotation speed 60 RPM.
External temperature 75° C.

In a first phase the polymers were added, then the piston was lowered and plasticization was allowed for one minute. The piston was then raised and the other ingredients were added.

From the moment in which the piston was lowered, the acquisition program of the twisting torque and of the temperature of the melted material was started for a period of 10 minutes.

The mixture was finally discharged.
ML (1+4) at 100° C. polymer base=36.7
ML (1+4) at 100° C. mixture=40.7
MLRA (ML relaxation area) mixture=414.3
Area/ML mixture=10.2
MRS(Slope)=−0.4326

| Example | ML (1 + 4) 100° C. Generating product | ML (1 + 4) 100° C. mixture | MLRA (area) | MRS (slope) | MLRA/ML |
|---|---|---|---|---|---|
| 11 comp. | 57.9 | 64.4 | 75.5 | −1.081 | 1.17 |
| 12 comp. | 30.5 | 37.1 | 32.1 | −1.094 | 0.87 |
| 13 | 36.7 | 40.7 | 414 | −0.433 | 10.2 |

From the above data it is clear that the mixture obtained with the product object of the invention (mixture of example 13), is definitely more elastic although it has an intermediate Mooney viscosity between those of the two comparative examples, therefore showing a better compromise between shape stability and viscosity.

It would therefore be possible to greatly reduce the viscosity of the mixture object of the invention anyhow obtaining sufficient elasticity to maintain the shape stability required by the application (i.e. given that the ratio area/ML is constant with respect to ML, at an ML=10 an elasticity higher than both the mixtures of the comparative examples should still be obtained).

Test of Extrusion with Piston Rheometer

Moreover, a test of extrusion with piston rheometer on the mixtures of the comparison example 12 and example 13 was carried out. Approximately 8 g of the mixture were placed in the cavity of the instrument, the thermostat controlled at 100° C., and under compression of the piston (which is also thermostat controlled at 100° C.) at constant pressure made to flow in a circular hole with 2 mm of diameter.

In every test the average flow is calculated as the ratio between extruded volume and time of the test itself and, moreover, the maximum flow rate is indicated (since the flow rate varies during the test the maximum flow rate allows a better comparison between tests carried out with different injection time).

|  | Example 12 | Example 3c |
|---|---|---|
| Rheo-V 40 bar 2 min. | | |
| Flow rate max mm³/s | 14.0 | 12.0 |
| Average flow rate mm³/s | 11.3 | 8.6 |
| Extruded surface | smooth | m.f. obvious |
| Rheo-V 50 bar 1 min. | | |
| Flow rate max mm³/s | 16.0 | Indeterminable |
| Average flow rate mm³/s | 10.2 | Indeterminable |
| Extruded surface | smooth | m.f. very obvious |
| Rheo-V 60 bar 1 min. | | |
| Flow rate max mm³/s | 54.8 | |
| Average flow rate mm³/s | 44.6 | |
| Extruded surface | nearly smooth | | m.f. = melt fracture

It is demonstrated that:
1. The product object of the invention produces an extruded material of better surface quality and therefore extrudible in conditions of greater pressure and therefore with greater flow rates.
2. The product of the invention, having also a Mooney viscosity higher than the reference product, comes out to be slightly more fluid in the same conditions of extrusion maintaining, obviously, all the advantages in terms of extruded quality and of stability of shape.
3. It is obvious that the advantages found in points 1 and 2 would be maximized in the case of products obtained according to the present invention but with lower molecular weight (expressed as Mooney viscosity) were used.

Section C: Application of the Rheological Modification to EPR Mixtures for the Sector of VII Additives for Lubricating Oils.

In the above examples, mixtures of EPM with high and low content of ethylene were prepared to demonstrate that the product object of the invention is also successfully applicable to create chemical bonds in the different original bases of polymer blends.

In this way, that which was originally a mixture of EPM with a different composition is transformed by the process object of the present invention into a block structure, particularly (but not exclusively) useful in the field of additives for motor lubricating oils.

The products of the experimental comparative examples 4c, 6A, 6B and EPM 1 were submitted to extraction with a mixture of solvents that, as known to the experts of the field, tend to separate the polymer chains by composition. The soluble product was then retrieved and analyzed to give the average propylene content. The results, obtained by extraction with an ether/hexane mixture 90/10, are shown in the following table:

|  |  | % wt propylene (FTIR) | |
|---|---|---|---|
| Example | % wt residue | Product extracted | Product residual |
| EPM 1 | 41.1 | 44.1 | 27.5 |
| 4 comparative | 32.3 | 40.4 | 28.7 |
| 6B | 14.9 | 39.1 | 30.1 |
| 6A | 35.0 | 39.7 | 32.0 |

From the table it can be noticed that the products object of the invention are characterized by a smaller differentiation between the compositions of the extract with respect to the residual material.

It is natural to conclude that in the samples object of the invention the original polymer phases are linked with chemical bonds, which make them no more completely separable with physical methods.

Even if said effect is also present in the comparative example 4 obtained according to the Patent Application EP1013673 of the same Applicant, all the products relative to the present invention have a much more evident effect. This effect cannot be explained in any way other than by the evident presence of high ethylene chains which, being grafted on high propylene chains, are positioned in the "extracted" fraction and by the presence of high propylene chains which, being grafted on high ethylene chains, are in the "residue" fraction.

In other words, the process object of the invention is suitable for transforming the physical mixtures of polymers (of which at least one is a polyolefin), in block copolymers exploitable for various applications.

The characterizations that follow are relative to an example of exploitation of the product object of the present invention in the application sector of the additives for motor lubricating oils.

Kinematic viscosity (KV) at 100° C. in solution at 1% p/p of the polymer in oil type SN 150.
Comparative example 3 KV=11.2 CSt
Comparative example 4 KV=12.0 CSt
Example 6B KV=11.8 cSt Pour Point in solution at 1% p/p of polymer in oil SN150 with added additive with PPD specific for high ethylene additives determined with the automatic Herzog instrument.
Comparative examples 3 PP=−25.5° C. (with 0.10% of PPD)
Comparative example 4 PP=−26.0° C. (with 0.10% of PPD)
Example 6B PP=−27.0° C. (with 0.10% of PPD)

Maintaining constant the structural characteristics that were shown by the characterizations, we observe that the product of example 6B, related to the invention, has a pour point, measured with the automatic Herzog instrument, that is better than that of the product of the comparative example 3 and also of 4c (which though remains slightly improved with respect to 3).

The obtained values are different in spite of the fact that the used reference oil contained a specific additive for products of the type of the comparative example (3): the differences, also thanks to the used instrument, are significant and can be translated, in a more evident manner, in application parameters such as the pumpability which is generally linked to the pour point but which is much more sensitive to the polymer structure. The tendency to have a lower pour points suggests the possibility of applying to the product lower PPD additive dosages, of using less specific PPD (more economical), and of increasing the ethylene amount in the final composition, with an increase of the thickening performances and an easier manipulation of granules.

To give a better interpretation of the pour point data not linked to the nature of the additives of the oil of reference, the products of the experimental examples 3, 4c and 6B, were submitted to an application test that shows the tendency of the polymer base to form self-associations of the crystalline joint structure type in solution and, consequently, capable of producing gelification phenomena at low temperatures.

This type of self-associative phenomenon impacts with the cold conditions rheology of the lubricating oils containing ethylene-propylene copolymers such as viscosity index improver additives, especially for phenomena of the "Yield Stress" type in the viscosimetric tests at low shear (pumpability).

In this test the product is:

dissolved at 3% in n-octane under reflux agitation, cooled in a quiet environment and stocked at ambient temperature for 24 h, inserted in the cavity of an automatic instrument for the determination of the Herzog pour point.

After fast heating at 45° C., the instrument produces a controlled cooling at the speed of 1° C./minute continuously measuring with an agitator the occurrence or not of the gelification of the solution. For said test an instrument for the automatic determination of the pour point manufactured by Herzog was used.

The results of the tests applying the above described process to the products of the experimental examples 3c, 4c and 6B are shown following herewith.

Temperature of gelification–Comparative example 3=−17.9° C.

Temperature of gelification–Comparative example 4=−20.3° C.

Temperature of gelification–Example 6B=−21.7° C.

Also in this case the results are evident. Although the molecular weights of these products are comparable with each other, the tendency to gelify is very different, especially considering that:

1. anyhow the phenomenon is not sensitive to small differences of molecular weight,
2. the mixture of polymers which constitute the polymer base is absolutely identical in all the products,
3. the repeatability of the process was estimated in 0.3° C.
4. the n-octane added with or not added with entirely amorphous products does not gelify throughout the full measuring range of the instrument (up to −49° C.).

The differences that make the product relative to the invention absolutely better than the reference product are therefore certainly attributable to the modification process object of the present invention.

The choice of the product 6B as the better product of the invention for the VII application was dictated by the difficulties that an excess of branching can induce in the application, particularly for speed of dissolution and stability at the mechanical shear.

Such ability of modulating the induced branchings is one of the evident benefits of the process object of the present invention, especially useful in relation to the effectiveness of controlling the degree of branching and in relation to the flexibility in the modification of the process (with respect, for instance, to a system of polymerization).

Section D: Application of Rheological Modification to EP(D)M/Polyolefins Mixtures in the Sector of Thermoplastic Elastomers.

The examples that follow have the purpose to demonstrate the applicability of the process object of the present invention to the sector of thermoplastic elastomers.

Example 16

The 70 cm$^3$ mixing room of a plastograph, equipped with roller type rotors, is filled with:

25.2 g of Dutral CO038 (60% with respect to the total polymer).

0.45 g of TMPTMA (approximately 1% with respect to the total polymer).

0.9 cm$^3$ of TBHP 70% in water (approximately 1.5% regarding all the polymer)

These ingredients were homogenized to an external temperature of 50° C. in mixing conditions of 50 RPM. The temperature of the room was then set at 160° C. and the following were added:

16.8 g of homopolymer Polypropylene with MFI (1)=0.3 g/10' (40% with respect to the entire polymer).

When the temperature of 165° C. was reached plasticizing was allowed for one minute and then the rotation speed of the rotors was increased to 200 RPM for 2 minutes.

The temperature increased, reaching and exceeding 200° C. when the test was almost finished.

After the test was finished, the product was left to cool to approximately 150° C. and was then discharged.

The thus obtained product was characterized, in comparison with a physical mixture of the starting products, as having the same composition (blend 1).

The product of example 16 and the comparison blend 1 were both dissolved in xylene at its boiling temperature.

By letting the solution to cool, the precipitation of crystalline polypropylene phase should occur while the EPR base should still be soluble.

The soluble fractions and the cold conditions insoluble residues were retrieved and analyzed as composition via FTIR, obtaining the results shown in the table:

| Analyzed Samples | % wt residual | % wt. propylene (FTIR) | |
|---|---|---|---|
| | | Extracted Product | Residual Product |
| Blend 1 | 44.4 | 31.6 | 81.1 |
| Example 16 | 78.9 | 33.9 | 64.7 |

| Analyzed Samples | % wt. propylene (FTIR) |
|---|---|
| CO038 tq | 30.8 |
| Polypropylene tq | 86.3 |

Analyzing the data in the table, it can clearly be seen that the reference product (blend 1) was, in great part, recomposed into the starting products through said simple process of separation.

It is equally clear that the obtained product through the process object of the invention is, on the contrary, more separable in its original components. This demonstrates that the structure of the product is composed of chains which, although coming from different polymer bases, are now linked with chemical bonds. In particular a great part of the elastomer is grafted on polypropylene chains that are insoluble in xylene in cold conditions.

There are however isotactic polypropylenic chains present also in the soluble part as qualitatively detected by the FTIR analysis, which are present neither in the Dutral CO038, nor in the extract of blend 1.

It is therefore completely logical and legitimate to think that the structure of this product consists of crystalline (isotactic PP) and amorphous (EPR) dominions, linked to each other due to the fact of belonging to the same chains.

It is therefore a typical structure of thermoplastic elastomer (for instance type SBS and SEBS) of polyolefinic nature and therefore with a better resistance to temperature.

Naturally, these elastomers have a clear advantage with respect to polyolefinic thermoplastic materials obtained through total or partial dynamic vulcanization because they do not contain vulcanized (insoluble) phases. In this way the product has advantages in the compounding phase, because the non vulcanized rubbery phase can withstand, anytime during the process, the addition of elastomers, fillers, oil or other additives to address in the rubbery phase. On the contrary, in the case of the vulcanized thermoplastic elastomers, after the vulcanization, it is nearly impossible to add additives for the rubbery phase.

Moreover, if for instance there was the need of designing an expanded product, after the vulcanization of the elastomeric phase it is possible to expand only the thermoplastic phase, while in the case object of the present invention, given that the elastomeric phase is not vulcanized, it is possible to address the expanding additives in every phase when it is desired to have an expansion.

Moreover, since the dynamic vulcanization with its consequent phase inversion between rubber and polypropylene is not expected, the process results globally simpler and there are not any limits in composition and hardness necessary for the phase inversion to be complete, avoiding the vulcanization of the continuous phase with the subsequent impossibility of machining the material.

Moreover, this material can be employed as:
compatibilizer to facilitate or to improve the preparation process of totally or partially vulcanized thermoplastic elastomers and the preparation of thermoplastic polypropylene-elastomers blends,
additive to increase the percentage of the rubbery phase of a vulcanized thermoplastic elastomer beyond the limit imposed by the phase inversion during the vulcanization.

Use as Modifier of Plastic Materials

Three experimental examples, shown below, have been carried out to characterize the behavior of the product of the invention for the modification of plastic materials (polypropylene) to confer better resilience and impact resistances.

Example 17 (Comparative)

In the Maris TM35V type extruder having screw diameter of 35 mm and L/D=32, used in the examples reported in the present patent, the following were mixed:
15 parts for 100 parts of total polymer of the product of the comparative examples 3,
85 parts of polypropylene copolymer having MFI L=40 g/10',
0.05 parts of antioxidant
RPM=100
Extruder external temperature=195-205° C.

The extruded product was then granulated, and then proper samples for the characterization were prepared in an injection moulding machine at the temperature of 200° C.

Example 18

In the Maris TM35V type extruder having screw diameter of 35 mm and L/D=32, used in the examples reported in the present patent, the following were mixed:
15 parts for 100 parts of total polymer of the product of the example 7A,
85 parts of polypropylene copolymer having MFI L=40 g/10',
0.05 parts of antioxidant
RPM=100
Extruder external temperature=195-205° C.

The extruded product was then granulated, and then proper samples for the characterization were prepared in an injection moulding machine at the temperature of 200° C.

Example 19 (Comparative)

In the Maris TM35V type extruder having screw diameter of 35 and L/D=32, used in the examples reported in the present patent, the following were mixed:
9 parts per 100 parts of total polymer of CO034,
6 parts per 100 parts of total polymer of CO058,
85 parts of polypropylene copolymer having MFI L=40 g/10',
0.05 parts of anti-oxidant
RPM=100
Extruder external temperature=195-205° C.

The extruded product was then granulated, and then proper samples for the characterization were prepared in an injection moulding machine at the temperature of 200° C.

The characterization data of the polymer mixtures relative to examples 17c, 18 and 19c are shown in the following table.

|  | Example | | |
| --- | --- | --- | --- |
|  | 17 (comp.) | 18 Acronym EPM | 19 (comp.) |
|  | Example 3c | Example 7A | EPM1 (c) |
| MFI E g/10' (blend) | 12.5 | 11 | 10.5 |
| Charpy kJ/m$^2$ | UNI ISO 179/95 with cut (A) | | |
| 23° C. | 10.55 | 11.30 | 9.48 |
| 0° C. | 7.90 | 9.81 | 8.89 |
| −20° C. | 7.80 | 9.79 | 7.49 |
| Izod kJ/m$^2$ | UNI ISO 180/96 with cut (A) | | |
| 23° C. | 12.39 | 13.84 | 12.47 |
| 0° C. | 12.23 | 13.45 | 11.77 |
| −20° C. | 12.09 | 12.76 | 12.12 |

From the exam of the table we observe that the impact energies are always better in the blend obtained using the product of the example of the invention (Ex. 7A).

Such differences are sensitive and can be as high to allow a gain of up to 30% in resilience and collision resistance.

The invention claimed is:

1. A process to modify the rheology of a EP(D)M polymer, said process consisting of:
treating, in conditions of high shear, a polymer mixture consisting of one or more EP(D)M polymers, optionally mixed with polyalpha-olefins, in presence of one or more polyfunctional vinyl monomers and of one or more hydroperoxides in water, wherein an amount of said the polyfunctional vinyl monomer is from 0.02 to 2% by weight,
wherein a molar ratio between said vinyl monomer and hydroperoxide is from 0.005/1 to 2/1, and
said process being carried out at a temperature from 75° C. to 260° C.;
in which the polymer mixture consists of one or more EP(D)M polymers selected from the group consisting of one or more EPM polymers which are ethylene-propylene copolymers, -one or more EPDM ter-polymers which are ethylene-propylene-not conjugated diene ter-polymers and mixtures thereof;
wherein an ethylene content of said EP(D)M polymers is from 85% to 40% by weight, and
wherein, if present, a maximum amount of said not-conjugated diene is 12% by weight.

2. The process according to claim 1, in which the molar ratio between vinyl monomer and hydroperoxide is from 0.01/1 to 1/1.

3. The process according to claim 1, which is carried out at a temperature from 140° C. to 210° C.

4. The process according to claim 1, in which the content of said ethylene of said EP(D)M polymers is from 76% to 45% by weight, and
wherein, if present, a maximum amount of said not-conjugated diene is 5% by weight.

5. The process according to claim 1, which is carried out at a shear higher than 100 sec$^{-1}$.

6. The process according to claim 5, which is carried out at a shear higher than 500 sec$^{-1}$.

7. The process according to claim 1, wherein the polyfunctional vinyl monomers are selected from the group consisting of
(i) monomers of general formula (Ia)

$(HR^1C{=}CR^2{-}X{-})_n{-}R^3$ (Ia)

wherein $R^1$ and $R^2$, equal or different from each other, are selected between —H and alkylic radical $C_1$-$C_5$, X=—COO; n=2-4;
$R^3$ is the polyfunctional radical to which the n unsaturated units are bonded; and
(ii) monomers of general formula (Ib)

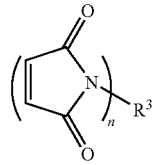

wherein n and $R^3$ has the above explained meaning.

8. The process according to claim 7, wherein n is 2 or 3.

9. The process according to claim 1, wherein said polyfunctional vinyl monomers are selected from the group consisting of trimethylolpropane trimethacrylate-, ethylene glycol dimethacrylate and N,N'-m-phenylene bismaleimide.

10. The process according to claim 1, wherein said hydroperoxide is t-butyl hydroperoxide (TBHP).

11. The process according to claim 1, wherein an amount of said polyfunctional vinyl monomer is from 0.05 to 1% by weight.

12. An EP(D)M polymer, obtained according to the process of claim 1 and having the following characteristics:
a medium ponderal molecular weight, obtained from the GPC analysis with a refractive index detector, in the range of 30,000-500,000;
a polydispersity, expressed as $M_w/M_n$, of lower than 7; and
a ratio between the area calculated according to the Mooney relaxation method and the Mooney itself of higher than 2.2.

13. A carbon black based elastomeric composition, comprising:
an EP(D)M polymer obtained by the process of claim 1.

14. A mineral filler based mixture, comprising:
an EP(D)M polymer obtained by the process of claim 1.

15. A plastic, comprising:
an EP(D)M polymer obtained by the process of claim 1.

16. A viscosity index improver, comprising:
an EP(D)M polymer obtained by the process of claim 1;
wherein said viscosity index improver is suitable for improving the viscosity index of a lubricating oil.

17. A process of preparing a carbon black based elastomeric composition, comprising:
adding carbon black to an EP(D)M polymer obtained by the process of claim 1.

18. A process of preparing a mineral filler based mixture, comprising:
adding a mineral filler to an EP(D)M polymer obtained by the process of claim 1.

19. A process of modifying a plastic, comprising:
adding an EP(D)M polymer obtained by the process of claim 1 to a plastic.

20. A process of improving the viscosity index of a lubricating oil, comprising:
adding an EP(D)M polymer obtained by the process of claim 1 to a lubricating oil.

21. The process according to claim 1, wherein said rheology of said EP(D)M polymer is modified without substantially modifying the distribution of the molecular weights.

* * * * *